July 26, 1960 C. B. TRIMBLE 2,946,530

RECORD TAPE TAKE-UP MEANS

Original Filed Sept. 30, 1954 2 Sheets-Sheet 1

INVENTOR
CEBERN B. TRIMBLE

BY Louis A. Kline
Albert L. Sessler, Jr.
HIS ATTORNEYS

RECORD TAPE TAKE-UP MEANS

Original Filed Sept. 30, 1954 2 Sheets-Sheet 2

INVENTOR
CEBERN B. TRIMBLE

BY Louis A. Kline
Albert L. Sessler, Jr.
HIS ATTORNEYS

United States Patent Office 2,946,530

Patented July 26, 1960

2,946,530

RECORD TAPE TAKE-UP MEANS

Cebern B. Trimble, Dayton, Ohio, assignor to The National Cash Register Company, Dayton, Ohio, a corporation of Maryland Original application Sept. 30, 1954, Ser. No. 459,476. Divided and this application Aug. 1, 1957, Ser. No. 675,752

6 Claims. (Cl. 242—55.11)

The present invention relates to tape-handling apparatus and particularly to a tape take-up means adapted for use in connection with other tape-processing equipment.

This application is a division of United States patent application Serial No. 459,476, filed September 30, 1954, now Patent No. 2,864,609.

Tape-processing equipment is widely used where large amounts of data are processed. Both magnetic tape and perforated tape form convenient means of storing information which it is desired to utilize in the future.

Although in some instances information-bearing tape may be used only once and then discarded, there are many occasions where it is desired that the tape, after having been run through the tape-processing equipment, be retained for future use. One example of this, of course, would be after the initial recording operation in which the desired information is first encoded on the tape. Another example is found where it is desired to use the same information, as recorded on the tape, a number of different times, or where the information is to be used by a number of different data-processing devices.

A take-up reel or spool furnishes perhaps the most common means of collecting and storing tape after a data-processing operation, such as reading or recording, has been performed on it. In the past, difficulty has been experienced in designing a simple, effective, and inexpensive take-up reel which minimizes inertia effects during intermittent operation of the tape-processing device with which it is associated and which is self-compenating in rotational speed as the amount of tape wound thereon changes. An additional problem has been to provide means for easy, rapid removal of the wound tape from such a reel.

With the foregoing in mind, among the objects of the present invention are the following: the provision of record tape take-up means which is simple and inexpensive to fabricate, while being at the same time rugged in construction; the provision of such apparatus in which inertia effects are minimized during intermittent operation of the tape-processing device with which it is associated; the provision of such apparatus in which compensation is automatically made for the changing rotational speed requirements as the amount of tape on the take-up means changes; and the provision of such apparatus including novel means for the tape attachment and easy, rapid removal of the tape when desired.

The objects of the invention are accomplished by a tape take-up reel which stores the processed tape, which may be either magnetic tape or perforated tape, in the form of a roll. A spool for receiving the tape is resiliently coupled to a flange which is rim-driven at a velocity insuring that the tape will be wound on the spool as fast as it is drawn through the tape-handling device with which the reel is associated. Slippage between the flange and the spool takes place when the tape is being stored on the spool at a speed slower than that at which the flange is driven. This provides automatic compensation for the change required in the rotational speed as the tape builds up on the spool, and also minimizes any inertia effects which the tape take-up means might have on the tape-processing system, during changes in tape speed. In addition, a novel method and means for attaching the tape to the spool are utilized, which means also permits the wound roll of tape to be easily removed from the spool.

The foregoing outlined features and objects of the invention, along with others appearing hereinafter, will become more apparent from a reading of the following detailed description of the invention when viewed in the light of the accompanying drawings, wherein.

The novel tape take-up means of the present invention will normally be associated with some form of tape-processing device. For purposes of illustration, the present invention is herein shown and described as being associated with the tape-reading apparatus disclosed in the United States patent application Serial No. 459,476, filed September 30, 1954, now Patent No. 2,864,609, of which this application is a divsion, and to which reference may be had for a complete description of the tape-reading apparatus. It will be understood, however, that the novel tape take-up means could be used with many other types of tape-processing devices.

Figure 1:
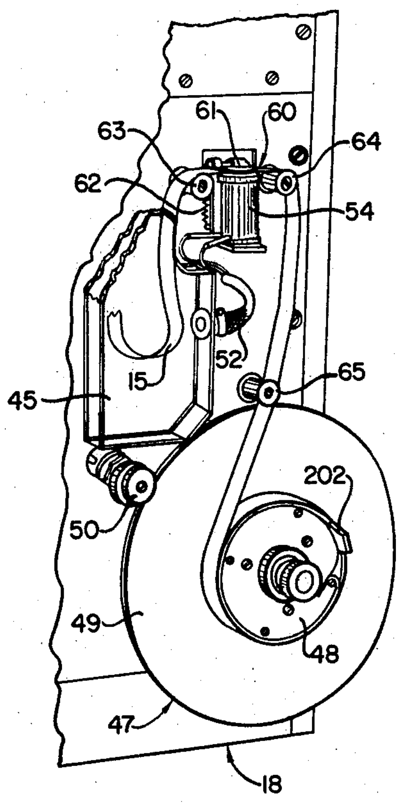
Fig. 1 is an isometric view of the tape take-up means of the present invention, shown in association with a tape-processing device, the latter being shown only in part.

The tape take-up reel 47 is shown in Fig. 1 as supported on a frame 18 of the tape-reading apparatus. The tape 15, after having been read by the tape-reading apparatus in the manner fully described in the above-cited application, is passed into an output tape loop box 45, over a first idler 63, through an auxiliary brake 60, over second and third idlers 64 and 65, and thence onto the take-up reel 47.

The tape take-up reel 47 includes a spool 48 and a flange 49, which is rim-driven by a continuously-driven rim capstan 50. The spool 48 is resiliently maintained in frictional engagement with the flange 49, so that slippage can occur between the spool and the flange when the tape is arrested. In the tape reader disclosed in the previously-cited application, the spool 48 receives tape 15 from the output tape loop box 45 under the supervision of a control circuit which in turn is controlled by a photocell contained in a shielded housing 52. The photocell is activated by a light beam from a source (not shown) whenever a loop of the tape 15 contained in the box 45 decreases in size sufficiently to permit the light beam to pass unobstructed across the extent of the box 45 and illuminate the photocell in the housing 52. In the usual operation of the control, the photocell is not activated by this light beam because the loop of the tape 15 in the box 45 normally hangs down sufficiently to interrupt the light beam.

When the photocell in the housing 52 is energized by the light beam due to shortening of the output loop of the tape 15, a brake coil 54 is energized to activate the auxiliary brake 60, thereby increasing the pressure applied by the armature 61 of the brake 60, in excess of its normal slight frictional force applied to the tape 15 due to its weight, to grip the tape 15 and arrest the motion of the tape between the output loop box 45 and the take-up reel 47. Application of the brake 60 causes the tape loop to lengthen sufficiently to interrupt the beam of light illuminating the photocell, and the coil 54 of the brake 60 is deenergized to permit the armature 61 to relieve the pressure applied to the tape 15 except for that occasioned by the chatter-eliminating spring 62, thereby permitting the output loop in the box 45 to shorten. The lengthening and shortening of the tape loop in the box 45 insures isolation between the take-up reel 47 and the main driving means of the tape-reading device.

Due to the output loop of the tape 15, the mass of the tape take-up reel 47 is substantially isolated from the tape feed of the tape-reading device and, accordingly, does not interfere with high-speed tape feed nor affect the rapid starting and stopping of the tape. Of course, it is obvious that, if desired, in some forms of tape-processing equipment, the tape may be fed directly from a processing station, such as the reading station of the illustrated tape reader, to the take-up reel 47 without formation of an output loop, and without use of the output loop box 45 and its associated equipment.

A supporting shaft 161 (Figs. 2 and 3) carries the flange 49 and the spool 48, on which the tape is stored. The flange 49 is freely fitted or otherwise journaled on the support shaft 161, which is fixed by any suitable means with respect to the frame 18. A washer **49*a* on the shaft 161 spaces the flange 49 from the frame 18 and, in cooperation with said frame, limits movement of the flange 49 axially of the shaft 161 in a direction away from the spool 48, which is left free to move relatively to the shaft 161. The opposing surfaces of the flange 49 and the spool 48 accommodate a disk of felt 162, which provides a friction surface capable of transmitting motion from the flange 49 to the spool 48. A ball bearing 163, having an inner race 164 and an outer race 165, with the balls 166 therebetween, is located on the shaft 161 adjacent to the outer surface of the spool 48 and is urged against the spool by a spring 167, retained on the shaft 161 through abutting engagement with a collar 168, pinned to the shaft by a screw or pin 169**.

The rim-driving capstan 50 is rigidly fixed to a driving shaft 170 by a pin 171 and includes a peripheral layer 172, of rubber or the like, for insuring good driving engagement with the flange 49. The flange is continuously driven by the rim capstan 50, and, in the absence of braking applied to the tape, the spool 48 is driven to receive tape through the engagement afforded by the felt disk 162. However, when the tape is arrested, as by operation of the brake 60 (Fig. 1), slippage occurs between the felt disk 162 and the flange 49, so that spool 48 comes to rest.

Similarly, the slippage afforded by the felt disk 162 provides an automatic means for compensating for the changes in angular velocity required of the spool 48 to maintain a uniform rate of take-up of the tape 15 as said tape builds up on the spool, since slippage between the flange 49 and the spool 48 is automatically increased as the tape builds up on said spool. Sufficient velocity is assigned to the rim-driving capstan 50 to insure that the tape will be taken up at least as rapidly as it is read at the reading station.

Figure 2:
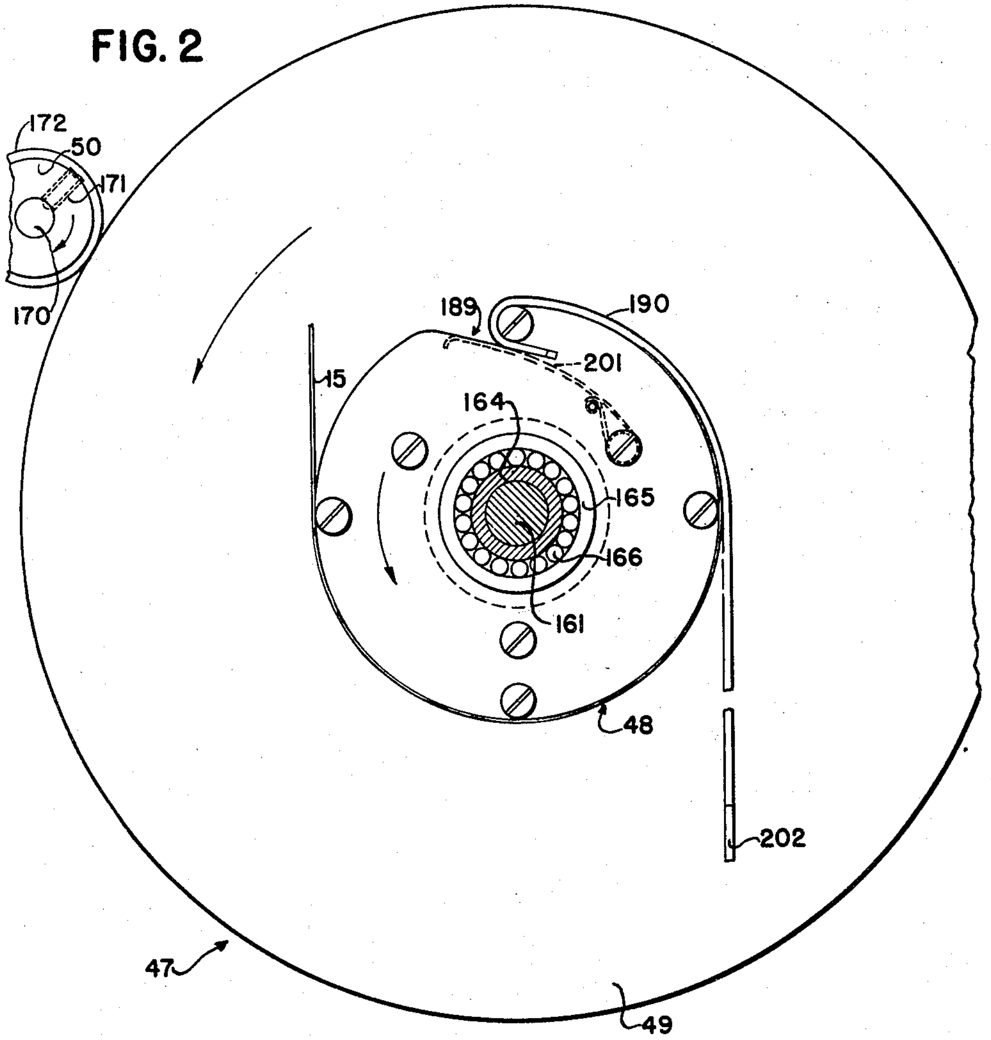
Fig. 2 is a view in elevation of the tape take-up reel, showing one means of attaching the tape thereto.
Figure 3:
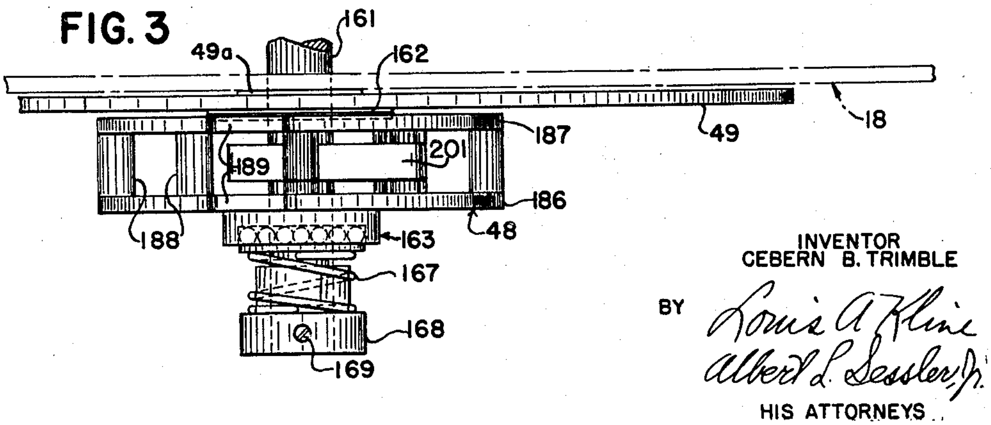
Fig. 3 is a view in plan of a portion of the structure of Fig. 2.

The tape 15 may be attached to the spool 48 of the pick-up reel 47 in any conventional manner. However, the instant invention utilizes a novel method and means for attaching the tape to the spool, which means also permits the wound roll of tape to be easily removed from the spool. The disks 186 and 187, spaced apart by the studs 188 and constituting the spool 48, include peripheral notches 189, adapted to receive an end of a strip 190 of felt or the like, retained in the notches by a spring clamp 201. When the tape is to be attached to the spool, the end of the tape is located beneath the felt strip, as is shown in Fig. 2, and the spool 48 is rotated in the direction of the arrow appearing thereon to wind the strip 190 over the tape and then the tape over the strip. A tab 202, which extends outwardly of the tape being wound upon the spool 48, is included on the strip 190. When it is desired to remove the roll of tape accumulated on the spool 48, the tab 202 is pulled outwardly of the spool to remove the strip from beneath the first two turns of the roll. Due to the thickness of the strip 190, its removal from between the inner turns of the roll in effect increases the inner diameter of the roll and provides clearance sufficient to enable the roll of tape to be easily lifted off the spool.

While the form of invention illustrated and described herein is admirably adapted to fulfill the objects aforesaid, it is to be understood that it is not intended to confine the invention to the form or embodiment disclosed herein, for it is susceptible of embodiment in various other forms.

What is claimed is:

1. A device for receiving and storing tape in the form of a roll comprising a spool core, a flange extending beyond the core boundary for the tape to abut in forming a roll, means arranged to coact with the periphery of the flange for driving said flange, yieldable engaging means for engaging the core and the flange so that the driving means may drive the core in a tape-taking-up direction, and an elongated flexible strip having a length approximating that of the circumference of the core and having a tab which extends beyond the side of the roll, said strip being wound about the core, together with the end of the tape as the tape is started about the core, the first few turns of the tape holding the strip in place, said tab on the strip enabling the strip to be withdrawn from the roll in a direction away from the flange to cause the effective core diameter to be reduced, thereby permitting removal of the roll.

2. Means for receiving and storing tape in the form of a roll, comprising a spool core, a flange extending against the core and against which tape is adapted to be stacked, means for driving said flange, at least one friction disk capable of transmitting motion from the flange to the core so that the dricing means is effective to drive said core, and an elongated strip attached to the core for overlying the end portion of tape disposed adjacent to the core and in turn overlaid by the tape as it is wound on the core in the form of a roll, whereby removal of the strip axially of the spool decreases the effective core size to permit removal of the roll.

3. Tape take-up means for receiving and storing tape in the form of a roll, comprising a supporting shaft, a spool core mounted free on the supporting shaft, a flange mounted free on the supporting shaft extending beyond the core and against which tape is adapted to be stacked, means for limiting the movement of the flange on the shaft in a direction away from the core, a first friction surface on the core, a second friction surface on the flange arranged in cooperative relationship with said first friction surface, means associated with the shaft for urging the first and second friction surfaces into engagement, driving means arranged in cooperative relation to the flange for driving said flange, and means for securing the tape to the spool core, the spool core being driven by the driving means through the flange and the engagement of the frictional surfaces to effect the taking up of the tape thereon, the frictional surfaces providing slippage therebetween when the tension on the tape exceeds a certain permissible limit.

4. Take-up means for receiving and storing tape in the form of a roll, comprising a supporting shaft, a spool core rotatably mounted on said shaft, a first friction surface on said spool core, a flange rotatably mounted on said shaft and extending beyond the core boundary for the tape to abut in forming a roll, a second friction surface on said flange arranged in cooperative relation to said first friction surface, means to limit movement of said flange on said shaft in a direction away from the spool core, a collar fixed to said shaft, and spring means extending between the collar and the spool core for holding the friction surfaces in engaged relation, whereby, when a driving force is applied to said flange for driving said flange, the spool core is driven through the engagement of the friction surfaces, the frictional engagement between the spool core and the flange enabling slippage therebetween when a dragging force is applied to the spool core.

5. A take-up spool for receiving and storing tape in the form of a roll, comprising a spool core, a notch in the periphery of the core, resilient retaining means disposed in cooperative relation to said notch, a flange extending beyond the core boundary for the tape to abut in forming a roll, and an elongated flexible strip having one end positioned in said notch and secured therein by the resilient retaining means, said strip having a length approximating that of the circumference of the core and having a tab which extends beyond the side of the roll, said strip being wound about the core together with the end of the tape as the tape is started about the core, the first few turns of the tape holding the strip in place, said tab on the strip enabling the strip to be withdrawn from the roll in a direction away from the flange to cause the effective core diameter to be reduced, thereby permitting removal of the roll.

6. The device of claim 5 wherein the tab extends from the strip near its unattached end, so that the strip is unrolled from the core as it is withdrawn from the roll.

References Cited in the file of this patent

UNITED STATES PATENTS

| | | |
|---|---|---|
| 1,081,039 | Hamann | Dec. 9, 1913 |
| 1,210,909 | Copersito | Jan. 2, 1917 |
| 1,232,753 | Baluta | July 10, 1917 |
| 1,498,133 | Swem et al. | June 17, 1924 |
| 1,797,539 | Arthur | Mar. 24, 1931 |
| 1,924,093 | Goldhammer et al. | Aug. 29, 1933 |
| 2,091,525 | Runge | Aug. 31, 1937 |
| 2,132,340 | Groupe | Oct. 4, 1938 |